Nov. 3, 1925.
J. B. FRAWLEY
1,560,344
DYNAMO ELECTRIC MACHINE
Filed Jan. 16, 1924
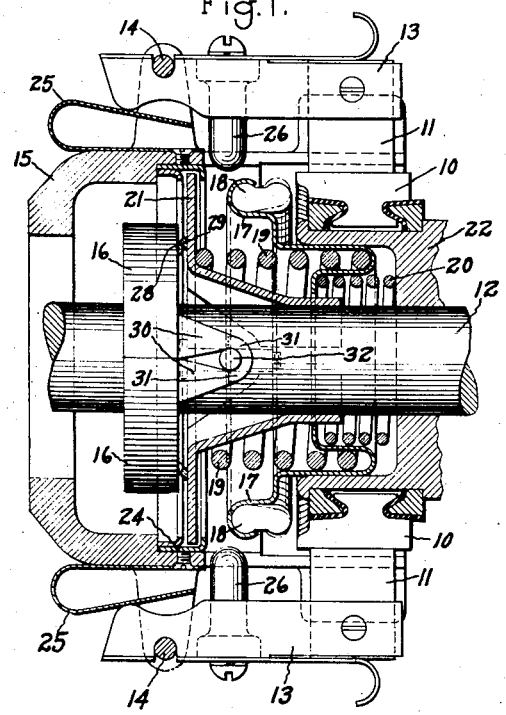
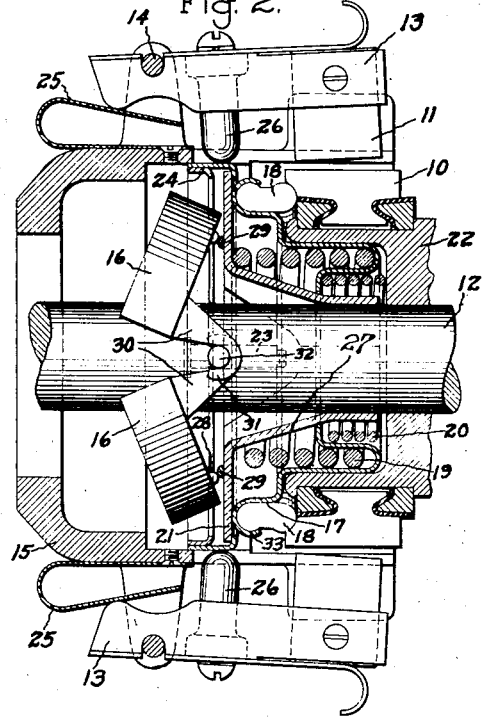
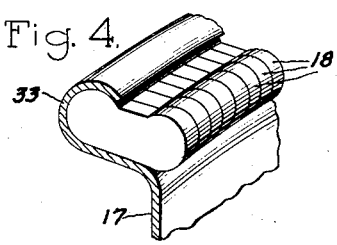
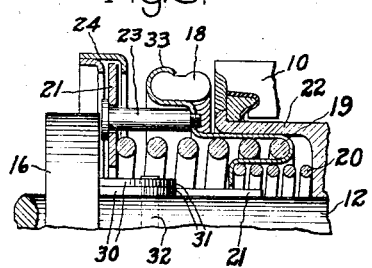
Inventor:
James B. Frawley,
by
His Attorney.

Patented Nov. 3, 1925.

1,560,344

UNITED STATES PATENT OFFICE.

JAMES B. FRAWLEY, OF PITTSFIELD, MASSACHUSETTS, ASSIGNOR TO GENERAL ELECTRIC COMPANY, A CORPORATION OF NEW YORK.

DYNAMO-ELECTRIC MACHINE.

Application filed January 16, 1924. Serial No. 686,649.

*To all whom it may concern:*

Be it known that I, JAMES B. FRAWLEY, a citizen of the United States, residing at Pittsfield, in the county of Berkshire, State of Massachusetts, have invented certain new and useful Improvements in Dynamo-Electric Machines, of which the following is a specification.

My invention relates to dynamo electric machines, and particularly to a brush raising and commutator short-circuiting device for such machines.

In certain types of dynamo electric machines, such as repulsion-induction motors, it is customary to provide a commutator and brushes for starting the machine, the commutator being short circuited when the machine is up to speed whereupon the machine runs as an induction motor. Machines of this type utilize the commutator and brushes, only when the machine is being started, and, therefore the brushes may be raised from the commutator after the machine has reached a predetermined speed. By thus raising the brushes, the brushes are not worn away and the efficiency of the machine is improved since there is no brush friction loss.

In changing the commutator from starting to running conditions, that is, from the condition in which the brushes bear on the commutator to the condition in which the commutator is short-circuited and the brushes raised, it is desirable to make the changes without opening any circuits in which current is flowing and which would produce an electric arc between the respective parts. To avoid the formation of such electric arcs it is necessary that the commutator be short-circuited before the brushes are raised.

The various types of commutator short-circuiting and brush-raising devices which have been devised in the past are open to the objection that no provision is made to compensate for the wearing off of the brushes. These devices operate satisfactorily as long as the brushes are of proper length but as the brushes are worn down, due to use, they will become short and if not renewed will be raised before the short-circuiting device has short-circuited the commutator.

It is the object of my invention to provide a novel brush-raising and commutator short-circuiting means which will overcome the above objection and insure, under all circumstances, that the commutator will be short-circuited before the brushes are raised.

The various features of novelty which characterize my invention are pointed out with particularity in the claims annexed to and forming a part of this specification. For a better understanding of my invention reference may be had to the following description taken in connection with the accompanying drawing, in which Fig. 1 is a partial, sectional view of a motor equipped with a brush-raising and commutator short-circuiting means made in accordance with my invention, showing the position of the respective parts when the machine is stationary; Fig. 2 is a view similar to Fig. 1 showing the position of the parts when the machine is running at normal speed; Fig. 3 is a fragmentary sectional view showing the manner of securing the parts together; and Fig. 4 is a perspective, fragmentary view of the commutator short-circuiting means.

In the embodiment of my invention shown in the drawing, 10 designates a commutator having brushes 11 cooperating therewith and adjacent the end of the commutator 10 is a speed responsive device 16 which is adapted to move a short-circuiting means 18 into abutting engagement with the commutator 10 and then operate to raise the brushes 11 therefrom. The operation of the speed responsive means 16 is opposed by springs 19 and 20 of different relative stiffness. The initial movement of the speed responsive device 16 is transmitted through the spring 19, which is the stiffer of the two, to move the short-circuiting means into short-circuiting engagement with the commutator 10 and compress the lighter spring 20 without substantially compressing the stiff spring 19. Further movement of the speed responsive means due to the action of centrifugal force compresses the stiff spring 19 and raises the brushes 11 from the commutator. From this it will be seen that the short-circuiting means 18 comes into full short-circuiting position and remains in this position while the speed responsive means 16 moves still further and into operative position to raise the brushes. Due to this construction and the independence of the short-circuiting means 18 and the brush-raising device, the commutator is always short-circuited first, and until the commutator is short-circuited, the brushes cannot be raised therefrom no matter how much they are worn.

The commutator 10 is mounted upon a shaft 12 which carries a speed responsive means in the form of weights 16. These weights 16 are adapted to move outwardly and engage a disc 21 which is biased away from the commutator by springs 19 and 20. The disc 21 engages an annular ring 24 which when moved axially along the shaft 12 in response to the speed responsive means 16 will raise the brushes 11 from the commutator 10. The springs 19 and 20 are of a different relative stiffness, spring 19 being the stiffer of the two, and a cup-shaped member 17 carrying radially disposed segmental pieces 18 for short-circuiting the commutator 10 is interposed between them. The stiffer spring 19 is interposed between the disc 21 and the cup-shaped member 17 and the lighter spring 20 is located between the member 17 and the rotor body 22. As the springs 19 and 20 are compressed the cup-shaped member 17 will be caused to move axially along the shaft and short-circuit the commutator 10. The disc 21 is movably secured to the cup-shaped member 17 by studs 23 (see Fig. 3) which are fastened to member 17 and pass through holes in the disc 21. These studs 23 maintain the spring 19 under some initial compression and permit the lighter spring 20 to move the short-circuiting means 18 away from the commutator 10 when the machine is running below a predetermined speed. This construction insures that the lighter spring 20 will be compressed first and thus the short-circuiting segments 18 will be forced into contact with the commutator before the disc 21 can move the annular ring 24, which it engages, over far enough to raise the brushes 11 from the commutator 10. It also permits the stiff spring 19 to expand first, and force the brush-raising annular ring 24 to move and permit the brushes 11 to make contact with the commutator 10 before the short-circuiting segments 18 can leave the commutator. It also produces a speed responsive means which, because of only having to overcome the light spring 20 at low speeds, as at starting, is very sensitive to an increase in speed, and because of the increased stiffness of the stiff spring 19 is very sensitive at high speeds, as when running, to a reduction in the speed.

The brush-holders 13 are pivoted by pins 14 to a brush-holder yoke 15, and the brush-holder yoke 15 is provided with springs 25 which bias the brush-holders 13 and the brushes 11 toward the commutator. The annular ring 24 is slidably mounted within the brush-holder yoke 15 and is adapted to be moved axially by disc 21 when the latter is displaced by the weights 16. The brush-holders 13 are provided with a tongue 26 which projects inward in the path of the annular ring 24 and is so located that the brush-holders 13 will be moved about the pivots 14 and raise the brushes from the commutator. The disc 21 surrounds the shaft 12 and is provided with a partial conical projection 27 which maintains it in a central position with respect to the shaft and also centers the stiff spring 19. The weights 16 are provided with raised projections 28 which cooperate with similar projections 29 on the disc 21 for localizing the point of applied force. The weights 16 are shown as semi-circular in shape and are provided with arms 30 having hooked ends 31 which project along each side of the shaft 12 and engage a pin 32 which extends transversely through the shaft. The hooked ends 31 of the arms 30 are held in engagement with the pin 32 by the springs 19 and 20 which tend to hold the disc 21 in its outermost position. The springs 19 and 20 also exert a pressure upon the weights 16 through the disc 21 and oppose the action of centrifugal force upon the weights 16 and determine the speed at which they will function. The cup-shaped member 17 is provided with an irregular shaped bottom which permits the springs 19 and 20 to be placed concentrically with respect to each other on opposite sides thereof, thus providing a novel means for securing the springs in their proper positions and effecting a saving of space.

The segmental pieces 18 are loosely held by a beading 33 (see Fig. 4) which is turned upon the outer edge of the cup-shaped member 17 so that they are free to move slightly outward in response to centrifugal force and engage the overhanging ends of the commutator segments. This type of mounting for the segmental pieces 18 permits them to make a wiping contact with the commutator 10 and thereby maintain a clean-contacting surface of good electrical conductivity and also compensates for any irregularities on the contacting surface of the commutator. When the machine is operating at normal speed the springs 19 and 20 will be compressed and the disc 21 will then come into contact with the cup-shaped member 17 and retain the segmental pieces 18 in contact with the commutator, and the annular ring 24 in engagement with the tongue 26. This permits the commutator to be maintained short-circuited and the brushes to be held raised by the speed responsive weights 16 independently of any intervening springs.

The operation of the brush-raising and commutator short-circuiting device shown in the drawing may be explained as follows: Assume that the motor is at rest and the parts are in the position as shown in Fig. 1.

Under these conditions the brushes 11 will be in contact with the commutator 10 and will short circuit a definite portion of the armature winding which is in proper relation with respect to the stator winding. When the rotor reaches a predetermined speed the weights 16 will be thrown outwardly due to centrifugal force and exert pressure upon disc 21 through the raised projections 28 and 29 and cause it to move axially along the shaft 12. As the disc 21 is moved along the shaft 12, it will exert a pressure through spring 19 on the cup-shaped member 17, causing it to move axially along the shaft 12 and compress the spring 20. As the speed of the machine increases, and the centrifugal force consequently increases, the cup-shaped member 17 moves farther in an axial direction causing the short-circuiting segments 18 to engage the commutator 10. After the segments 18 engage the commutator there will be no further compression of spring 20. The short-circuiting segments 18, coming into contact with the commutator, prevent further movement of the cup-shaped member 17. As the weights 16 respond further to increases in the speed of the machine, the disc 21 will move still farther, compressing stiff spring 19. The annular ring 24 will be moved along with the disc 21 and engage the tongue 26 on the brush-holders 13 and raise the brushes 11 from the commutator. The machine will then operate with the armature winding completely short-circuited and have good running characteristics, and at the same time be free of the brush friction which would be present were the brushes not raised.

When the motor stops for any reason as when the power is cut off, the weights 16 will move inwardly due to a decrease in centrifugal force and the expansion of stiff spring 19. This will cause the annular ring 24 to move axially from under the tongue 26 on the brush-holders and permit the springs 25 to force the brushes 11 into contact with the commutator 10. As the motor slows down still further the stiff spring 19 will become expanded to such an extent that the light spring 20 will begin to expand. As the light spring 20 expands it will move the short-circuiting segments 18 away from the commutator 10 and the motor will be ready to be started again.

From the above it will be seen that, when the motor is being started, the short-circuiting segments 18 will make contact with and short-circuit the commutator before the brushes 11 can be raised, and that when the motor is stopping, the brushes 11 will be lowered again, and make contact with the commutator 10 before the short-circuiting segments 18 can leave the commutator.

When the machine is started, the segmental pieces 18 will be thrown outwardly, and when they engage the commutator 10 they will be forced inwardly along the underside of the projecting ends of the commutator segments, and thus make a wiping contact which will keep the contacting surfaces clean. The segmental pieces 18, being independently pivoted, will also compensate for unevenness in the contacting surfaces, as it will be seen that, should one of them be prevented from engaging the commutator at its end, it will nevertheless make contact due to centrifugal force along its outer edge.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

What I claim as new and desire to secure by Letters Patent of the United States, is:—

1. In a dynamo electric machine, a commutator, brushes for said commutator, a short-circuiting means for said commutator, a speed responsive device adapted to operate said short-circuiting means and subsequently raise said brushes, and springs of different relative stiffness for opposing said speed responsive device, the initial movement of said speed responsive device being transmitted through the stiffer spring to move said short-circuiting means into short-circuiting engagement with said commutator and compress the lighter spring without substantially compressing said stiff spring, further movement of said speed responsive device compressing said stiff spring and raising said brushes.

2. In a dynamo electric machine, a commutator, brushes for said commutator, a short-circuiting means for said commutator, a brush raising means, a speed responsive device adapted to operate said short-circuiting and brush-raising means, and springs of different relative stiffness for opposing said speed responsive device, the initial movement of said speed responsive device being transmitted through the stiffer spring to move said short-circuiting means into engagement with said commutator and compress the lighter spring without substantially compressing said stiffer spring, further movement of said speed responsive device compressing said stiff spring and operating said brush-raising means.

3. In a dynamo electric machine, a commutator, brushes for said commutator, a short-circuiting means for said commutator, a speed responsive device adapted to operate said short-circuiting means and subsequently raise said brushes, and springs of different relative stiffness for opposing said speed responsive device, the weaker spring acting between said commutator and the short-circuiting means to oppose the short-circuiting of said commutator and the stiffer spring acting between said commutator and said brush-raising means to delay the raising of said brushes, the initial movement of said speed responsive device being transmitted through the stiffer spring to move said short-circuiting means into engagement with said commutator and compress the lighter spring without substantially compressing said stiffer spring, further movement of said speed responsive device compressing said stiffer spring and operating said brush raising means.

4. In a dynamo electric machine, a commutator, brushes for said commutator, a short-circuiting means for said commutator, a speed responsive device adapted to operate said short-circuiting means and raise said brushes, and springs acting on each side of short-circuiting means and opposing said speed responsive device, said springs having different relative stiffness, the initial movement of said speed responsive device being transmitted through the stiffer spring to move said short-circuiting means into engagement with said commutator and compress the lighter spring without substantially compressing said stiffer spring, further movement of said speed responsive device compressing said stiffer spring and operating said brush raising means.

5. In a dynamo electric machine, a commutator, brushes for said commutator and adapted to be raised therefrom, a speed responsive device adapted to respond to centrifugal force for raising said brushes, a cup-shaped member, commutator short-circuiting segments pivotally mounted upon said cup-shaped member, and springs of different relative stiffness acting in opposition to each other and cooperating with said speed responsive device, said short-circuiting device operating to short-circuit said commutator when it reaches a predetermined speed and before said brushes are raised, and then operating to raise said brushes.

6. In a dynamo electric machine, a commutator, brushes for said commutator, a short-circuiting means for said commutator, a speed responsive device adapted to operate said short-circuiting means and subsequently raise said brushes, a member for supporting said short-circuiting means, and springs acting on each side of said member for opposing said speed responsive means, said springs having different relative stiffness and cooperating with said speed responsive device to cause said member to move axially toward said commutator, the initial movement of said speed responsive device being transmitted through the stiffer spring to move said short-circuiting means into engagement with said commutator and compress the lighter spring without substantially compressing said stiffer spring, further movement of said speed responsive device compressing said stiffer spring and operating said brush raising means.

7. In a dynamo electric machine, a commutator, brushes adapted to make contact with said commutator, brush-holders for said brushes, and means for short-circuiting said commutator and raising said brushes comprising a cup-shaped member, springs acting in opposite directions and concentrically arranged, one on one side of said cup-shaped member and the other on the other side thereof, a disc having a conical central projection extending into said springs, an annular member adapted to engage said disc and said brush holders, and centrifugally responsive weights cooperating with said springs and said annular member for first short-circuiting said commutator and then raising said brushes when a predetermined speed is reached.

8. In a dynamo electric machine, a shaft, a commutator on said shaft, brushes for said commutator adapted to be raised therefrom, a speed responsive device adapted to respond to centrifugal force for raising said brushes, a member having means for short-circuiting said commutator, and springs of different relative stiffness cooperating with said speed responsive device and acting upon said member, said speed responsive device acting through one of said springs to compress the other and move said member axially along said shaft to short-circuit said commutator and subsequently compress the former of said springs and raise said brushes from said commutator.

9. In an electric motor, a commutator, brushes in contact with said commutator, a member adapted to short-circuit said commutator, springs disposed on each side of said member, and speed responsive means adapted to move said member axially along said shaft to cause said member to short-circuit said commutator and subsequently raise said brushes from said commutator, said speed responsive means acting independently of said springs to hold said brushes in the raised position and said short-circuiting member in contact with said commutator.

10. In a dynamo electric machine, a commutator, brushes for said commutator, a short-circuiting means for said commutator, a speed responsive device adapted to operate said short-circuiting means and subsequently raise said brushes, and springs of different relative stiffness for opposing said speed responsive device and arranged on opposite sides of said short-circuiting means, the weaker spring acting between said commutator and the short-circuiting means to oppose the short-circuiting of said commutator and the stiffer spring acting between said commutator and said brush-raising means to delay the raising of said brushes, the initial movement of said speed responsive device being transmitted through the stiffer spring to move said short-circuiting means into engagement with said commutator and compress the lighter spring without substantially compressing said stiffer spring, further movement of said speed responsive device compressing said stiffer spring and operating said brush raising means.

11. In a dynamo electric machine, a commutator, brushes for said commutator, a short-circuiting means for said commutator, a speed responsive device adapted to operate said short-circuiting means and subsequently raise said brushes, and springs of different relative stiffness for opposing said speed responsive device and arranged on opposite sides of said short-circuiting means, the stiffer spring being adapted to first, transmit movement from said speed responsive means to compress the lighter spring and operate said short-circuiting means, and then yield further to permit said speed responsive device to raise said brushes from said commutator.

12. In a dynamo electric machine, a commutator, brushes for said commutator, a short-circuiting means for said commutator, a speed responsive device adapted to operate said short-circuiting means and subsequently raise said brushes, and springs of different relative stiffness concentrically arranged on opposite sides of said short-circuiting means for opposing said speed responsive device, the initial movement of said speed responsive device being transmitted through said stiff spring to move said short-circuiting means into short-circuiting engagement with said commutator and compress said light spring without substantially compressing said stiff spring, further movement of said speed responsive device compressing said stiff spring and raising said brushes.

13. In a dynamo electric machine, a commutator, brushes for said commutator, a short-circuiting means for said commutator, movable contact pieces pivoted on said short-circuiting means adapted to make wiping contact with said commutator, a speed responsive device adapted to operate said short-circuiting means and subsequently raise said brushes, and springs of different relative stiffness for opposing said speed responsive means, the initial movement of said speed responsive device being transmitted through said stiff spring to move said short-circuiting means into short-circuit engagement with said commutator and compress said light spring without substantially compressing said stiff spring, further movement of said speed responsive device compressing said stiff spring and raising said brushes.

In witness whereof, I have hereunto set my hand this 14th day of Jan. 1924.

JAMES B. FRAWLEY.